United States Patent [19]
Kikuchi et al.

[11] Patent Number: 6,075,346
[45] Date of Patent: Jun. 13, 2000

[54] SECONDARY BATTERY CHARGE AND DISCHARGE CONTROL DEVICE

[75] Inventors: Yoshiaki Kikuchi; Fumihiko Asakawa; Kazuo Tojima, all of Toyota; Susumu Ukita, Nagoya; Yoshimi Shoji, Takahama; Toshiaki Nakanishi, Toyohashi; Tadao Kimura, Kobe, all of Japan

[73] Assignees: Toyota Jidosha Kabushiki Kaisha, Toyota; Matsushita Electric Industrial Co., Ltd., Osaka, both of Japan

[21] Appl. No.: 09/167,488

[22] Filed: Oct. 7, 1998

[30] Foreign Application Priority Data

Oct. 13, 1997 [JP] Japan ................................. 9-278795
Dec. 9, 1997 [JP] Japan ................................. 9-338423

[51] Int. Cl.$^7$ ........................................................ H02J 7/04
[52] U.S. Cl. ............................................ 320/150; 320/137
[58] Field of Search .................................... 320/150, 151, 320/152, 154, 137

[56] References Cited

U.S. PATENT DOCUMENTS 5,332,956   7/1994   Oh ............................................ 318/799
5,703,469  12/1997   Kinoshita ................................. 320/152

FOREIGN PATENT DOCUMENTS

4422005 A1  12/1995  Germany.
7-67209      3/1995  Japan.
2 286 299    8/1995  United Kingdom.
WO 96/22625  7/1996  WIPO.

OTHER PUBLICATIONS

K. Shimizu et al., "On–Board Battery Management System with SOC Indicator" EVS–13. 13$^{th}$ International Electric Vehicle Symposium, Osaka, Oct. 13–16, 1996 Sessions 5A–6H+Poster/Dialogue Session, vol. 2, No. SYMP. Oct. 13, 1996, pp. 99–104, XP000688949, Japan Electric Vehicle Association.

W. Retzlaff, "On–Board Battery Management System Badicoach" EVS–13, 13$^{th}$ International Electric Vehicle Symposium, Osaka, Oct. 13–16, 1996 Sessions 5A–6H+Poster/Dialogue Session, vol. 2, No. SYMP. 13, Oct. 13, 1996, pp. 666–671, XP000688985, Japan Electric Vehicle Association.

*Primary Examiner*—Peter S. Wong
*Assistant Examiner*—Lawrence Luk
*Attorney, Agent, or Firm*—Oliff & Berridge, PLC

[57] ABSTRACT

The charge and discharge are performed by a proper electric power corresponding to the service environment of a battery and the state of the battery. When the temperature of the battery is not more than a specified temperature, or not less than another specified temperature, the upper limit value Pin-s of the charging electric power and the upper limit value Pout-s of the discharging electric power are determined so as to be smaller than those at a normal temperature. The temperature of the battery is detected, and the charging electric power and the discharging electric power are determined so that they may be not more than the upper limit values Pin-s, Pout-s of the charging and the discharging electric power at this temperature, and the charge control of the battery is performed.

7 Claims, 4 Drawing Sheets

SECONDARY BATTERY CHARGE AND DISCHARGE CONTROL DEVICE

BACKGROUND OF THE INVENTION

1. Field of the Invention

The present invention relates to the control of charge and discharge of a secondary battery, and more especially to the control of charge and discharge by which the electric power of charge and discharge is limited on the basis of the environment where a secondary battery is positioned and the state of the secondary battery.

2. Description of the Related Art

An electric vehicle (including a hybrid electric vehicle) obtaining the total or a part of the driving force of the vehicle by an electric motor, has a secondary battery (hereafter, referred to simply as a battery) mounted on the vehicle, and by the electric power accumulated in this battery, said electric motor is driven. Regenerative braking is a characteristic function in such an electric vehicle. In regenerative braking, during vehicle braking, the kinetic energy of the vehicle is transformed into the electric energy by making said electric motor function as an electricity generator. The obtained electric energy is accumulated in the battery and is reused for acceleration or other vehicle needs. Accordingly, with regenerative braking, it is possible to reuse energy is nomally radiated into the atmosphere as thermal energy in a conventional automobile which runs by an internal combustion engine alone, and the efficiency of the energy can considerably be improved.

Here, in order to effectively accumulate the electric power generated during regenerative braking in a battery, it is necessary for the battery to have a corresponding margin of capacity. Furthermore, in a type of hybrid electric vehicle in which the generator is driven by the heat engine mounted on the vehicle and generates the electric power and this electric power can be accumulated in a battery, the electric power accumulated in the battery, that is, the charge level can freely be controlled. Consequently, in such a hybrid electric vehicle, it is desirable that the charge level of a battery be controlled such that the charge level is approximately in the middle state (50~60%) between the state of full charge (100%) and the state of no charge (0%), so that the regenerative power may be received, and so that the electric power may be supplied to the electric motor immediately if a request is made.

A battery mounted on an electric vehicle may operate in various service environments. When such a battery is used in a cold area, it is considered that in some cases, the battery is used in an environment at a temperature of −10° C. or less, or sometimes at a temperature of −20° C. or less. Furthermore, use at high temperatures, the raising of battery temperature by operation of the battery, and use in an environment where the temperature 40° C. remains above, must all be considered. When a battery is used in such severe environments, a control corresponding to the characteristics of the battery is necessary. Especially, at a low temperature, there is such a problem that the rate of the chemical reaction in a battery is lowered, and therefore, the voltage is lowered when a large current is allowed to flow, so that a necessary voltage cannot be obtained. Furthermore, at a high temperature, there is such a problem that the degradation of a battery is accelerated. In Japanese Patent Laid-open Publication No. Hei 7-67209, a technique by which the voltage of charge is controlled according to the temperature of the electrolytic solution of the battery, is disclosed.

However, even if the control of the voltage of charge is performed as shown by the technique described in the above publication, that control alone cannot sufficiently restrain the degradation of a battery at a high temperature. Furthermore, in the above publication, it is not recognized that a heavy current should not be allowed to flow at a low temperature. Especially, if the control of the charging voltage is alone performed, the control of the electric power of discharge cannot be performed.

Furthermore, in a case where the charge level of a battery is low, it is necessary to limit the discharge so that the charge level may not become 0%. On the contrary, in a case where the charge level is high, it is necessary to control the charge so that the charge level may not exceed 100%.

SUMMARY OF THE INVENTION

The present invention is made to solve the above mentioned problems, and has an object of providing a secondary battery charge and discharge control device by which a proper control of charge and discharge can be performed according to the service environment of a battery and the state of the battery.

In order to solve the above mentioned problems, the secondary battery charge and discharge controller according to the present invention comprises a temperature detector for detecting the temperature of the secondary battery, and a limiter for controlling the charging and the discharging electric power so that the detected temperature may not exceed a first previously determined upper limit value of the charging and the discharging electric power which changes according to the temperature, in the case where said detected temperature is a first specified temperature or less. Consequently, it is possible to restrain the flowing of a heavy current in an environment at a low temperature, and to prevent the terminal voltage of a battery from lowering.

Furthermore, another secondary battery charge and discharge controller according to the present invention comprises a temperature detector for detecting the temperature of the secondary battery, and a limiter for controlling the charging and the discharging electric power so that said detected temperature may not exceed a previously determined upper limit value of the charging and the discharging electric power which changes according to the temperature, in the case where said detected temperature is a specified temperature or more. Consequently, it is possible to prevent the temperature of the battery from further rising, and to avoid the degradation of the battery when the temperature of the battery becomes high.

Still further, to the secondary battery charge controller, a charge level detector for detecting the charge level of the secondary battery is provided, and the limiter controls the charging and the discharging electric power so that it may not exceed the upper limit value which is lowest among the previously determined upper limit value of the charging and the discharging electric power of changing according to the charge level, and the upper limit value based on said temperature. Consequently, when the charge level approaches 100%, the charging electric power is restrained, so that the charge level may be prevented from being extremely increased. On the other hand, when the charge level approaches 0%, the electric power of discharge is restrained, so that the charge level may be prevented from being extremely decreased.

Furthermore, another secondary battery charge and discharge controller according to the present invention comprises a temperature detector for detecting the temperature of a secondary battery; a charge level detector for detecting the charge level of the secondary battery; and a charge and discharge electric power limiter which corresponds to said detected temperature and said detected charge level, and controls the charging and the discharging electric power so that it may not exceed a previously determined upper limit value of the charging and the discharging electric power.

Furthermore, it can be arranged that any one of the above mentioned charge and discharge control devices is mounted on a hybrid electric vehicle which has a heat engine and an electric motor as driving sources and in which the secondary battery is charged with at least either the electric power generated by a part of the output of the heat engine or the regenerative electric power during the braking, and by this charge and discharge device, the control of the secondary battery mounted on the hybrid electric vehicle, is performed. Not only hybrid electric vehicles but all types of vehicles are commonly used in environments of various temperatures, and further, as a vehicle is a movable body, it is difficult to control battery temperature through use of a heating device, cooling device, or the like for making the temperature of a battery constant. By using the secondary battery charge and discharge control device of the present invention, a hybrid electric vehicle which has a high environmental adaptability can be provided.

BRIEF DESCRIPTION OF THE DRAWING(S)

DESCRIPTION OF THE PREFERRED EMBODIMENT

Figure 1:
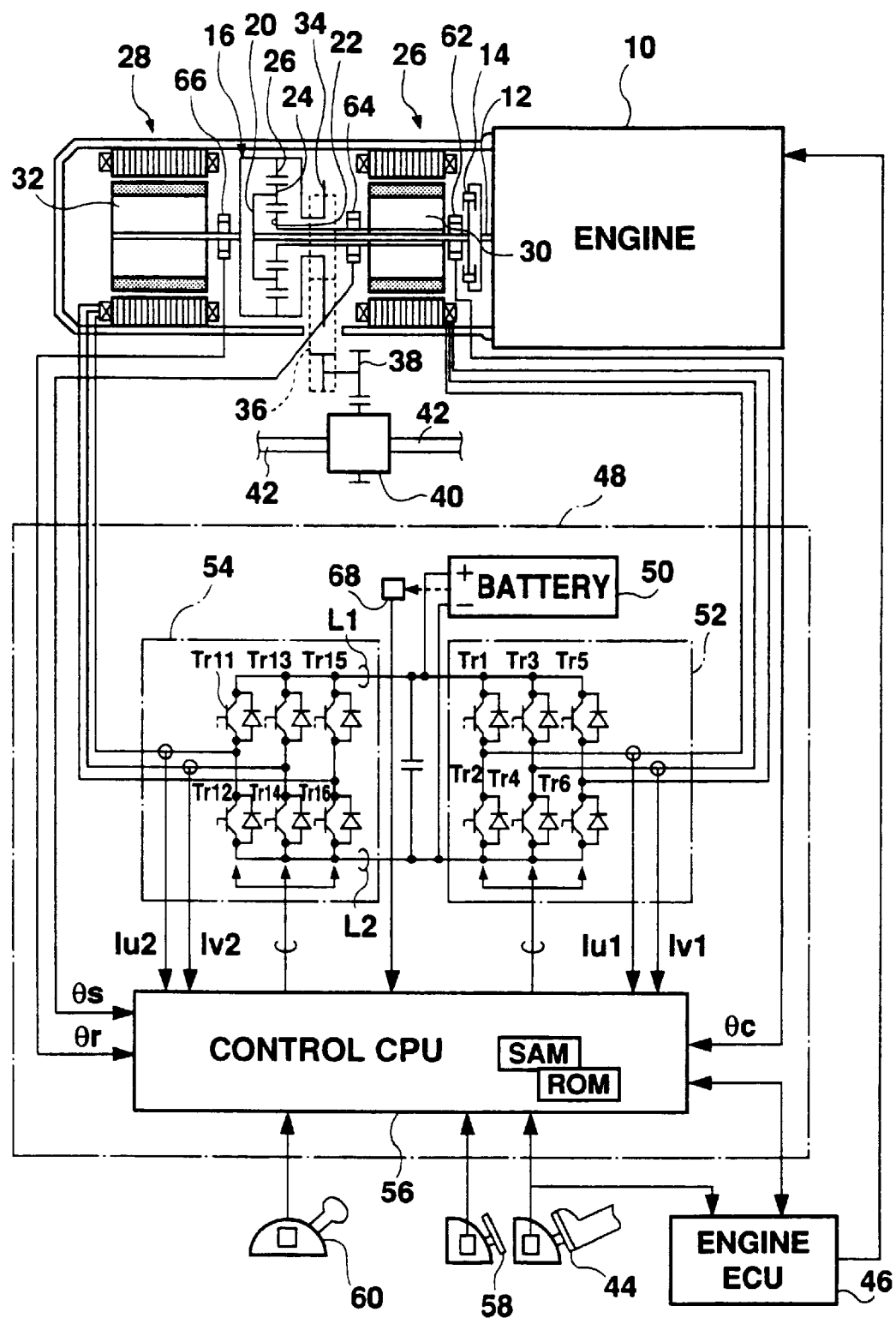
FIG. 1 is a figure showing the rough arrangement of a driving system of a hybrid electric vehicle.

An preferred embodiment of the present invention (hereafter, referred to simply as the embodiment) will be described below with reference to the drawings. In FIG. 1, a rough figure of a power plant of a vehicle to which a charge control device of the present invention is mounted, is shown. To an output shaft 12 of an engine 10, a planetary carrier 20 supporting a planetary gear 18 of a planetary gear mechanism 16 is connected through a torsional damper 14. A sun gear 22 and a ring gear 24 of the planetary gear mechanism 16 are respectively connected to rotors 30, 32 of a first motor generator 26 and a second motor generator 28. The first and second motor generators 26, 28 function as a three-phase alternating current generator or a three-phase alternating current motor. To the ring gear 24, a power take-out gear 34 is further connected. The power take-out gear 34 is connected to a differential gear 40 through a chain 36 and a gear train 38. On the output side of the differential gear 40, a drive shaft 42 at the tip of which a driving wheel (not shown in the figure) is joined, is connected. By the above mentioned arrangement, the output of the engine 10 or the first and second motor generators 26, 28 is transmitted to the driving wheel, to drive the vehicle.

In the engine 10, the output power, the rotational speed, and the like thereof are controlled by an engine ECU 46 on the basis of the manipulated variable of an accelerator pedal 44, the environmental conditions such as cooling water temperature or intake manifold pressure, and further, the operational states of the first and second motor generators 26, 28. Furthermore, the first and second motor generators 26, 28 are controlled by a control device 48. The control device 48 includes a battery 50 (secondary battery) which supplies the electric power to two motor generators 26, 28 and receives the electric power from them. In the present embodiment, the battery 50 is a nickel hydrogen battery. The exchanges of the electric power between the battery 50 and the first and second motor generators 26, 28 are respectively performed through a first inverter 52 and a second inverter 54. The control of two inverters 52, 54 is performed by a control CPU 56, based on information of the operational state of the engine 10 from the engine ECU 46, the extent of operation of the accelerator pedal 44, the extent of operation of a brake pedal 58, the shift range determined by a shift lever 60, the state of charge of the battery, and further, the rotational angle θ s of the sun gear, the rotational angle θ c of the planetary carrier, and the rotational angle θ r of the ring gear of the planetary gear mechanism 16, and the like. Furthermore, the rotational angles of three components of said planetary gear mechanism 16 are respectively detected by a planetary carrier resolver 62, a sun gear resolver 64, and a ring gear resolver 66. The electric power accumulated in the battery, that is, the charge level is calculated by a battery ECU 68. The control CPU 56 controls transistors Tr1~Tr6, Tr11~Tr16 of the first and second inverters 52, 54 on the basis of the above mentioned various conditions and the u phase and v phase electric currents Iu1, Iv1, Iu2, Iv2 of the first and second motor generators 26, 28, and further, the electric currents L1, L2 supplied from or supplied to the battery or the inverter on the other side, and the like.

The rotational speed Ns of the sun gear, the rotational speed Nc of the planetary carrier, and the rotational speed Nr of the ring gear of the planetary gear mechanism 16 are related as shown by the following expression:

$$Ns=Nr-(Nr-Nc)(1+\rho)/\rho \quad (1)$$

where ρ is the gear ratio between the sun gear and the ring gear.

That is, if two of the three rotational speeds Ns, Nc, Nr are known, the remaining rotational speed can be determined. The rotational speed Nr of the ring gear is determined by the speed of the vehicle and, therefore, if either rotational speed of the rotational speed Nc of the planetary carrier, that is, the speed of the engine, or the rotational speed Ns of the sun gear, that is, the rotational speed of the first motor generator, is found, the other may be determined. Then, the field currents of the first and second motor generators 26, 28 are controlled according to the rotational speeds at that time, and whether these motor generators shall be operated as a generator or operated as a motor, is determined. If two motor generators 26, 28 consume the electric power as a whole, the electric power is brought out from the battery 50, and if they generate electricity as a whole, the battery 50 is charged. For example, when a decreasing charge level of the battery 50 is detected by the battery ECU 68, power generation may be performed by either or both of the two motor generators 26, 28 by using a part of the torque generated by the engine 10, and the charge to the battery 50 is performed. Furthermore, when the charge level of the battery 50 is increased, the output power of the engine 10 is a little restrained, and the second motor generator 28 is operated as a motor, and the torque generated by this is controlled so as to be used for the running of the vehicle. Furthermore, during the braking, either or both of the two motor generators 26, 28 are operated as generators, and the generated electric power is accumulated in the battery 50.

Since it is difficult to predict when the braking of an automobile will be performed, it is desirable that the battery 50 be in a state where the electric power generated by the regenerative braking can sufficiently be received. On the other hand, the battery 50 must be able to ensure a certain charge level for operating the second motor generator 28 as a motor when the output power of the engine 10 alone cannot achieve an acceleration desired by the driver. In order to fulfill this condition, the charge level of the battery 50 is controlled so as to be approximately one half of the battery capacity, that is, the maximum electric power which can be accumulated in the battery. In the present embodiment, the control is performed so that the charge level may be approximately 60%.

Especially, for a hybrid electric vehicle in which a battery can be charged by generating electricity with the output power of an engine, by properly controlling the charge level of a battery, the regenerative electric power during braking is sufficiently recovered and the energy efficiency is raised, and further, during acceleration, a desired acceleration can be achieved. In other words, in the case of the above mentioned hybrid electric vehicle, in order to raise the energy efficiency and in order to obtain a desired acceleration and the like, it is necessary to properly control the charge level of a battery.

Figure 2:
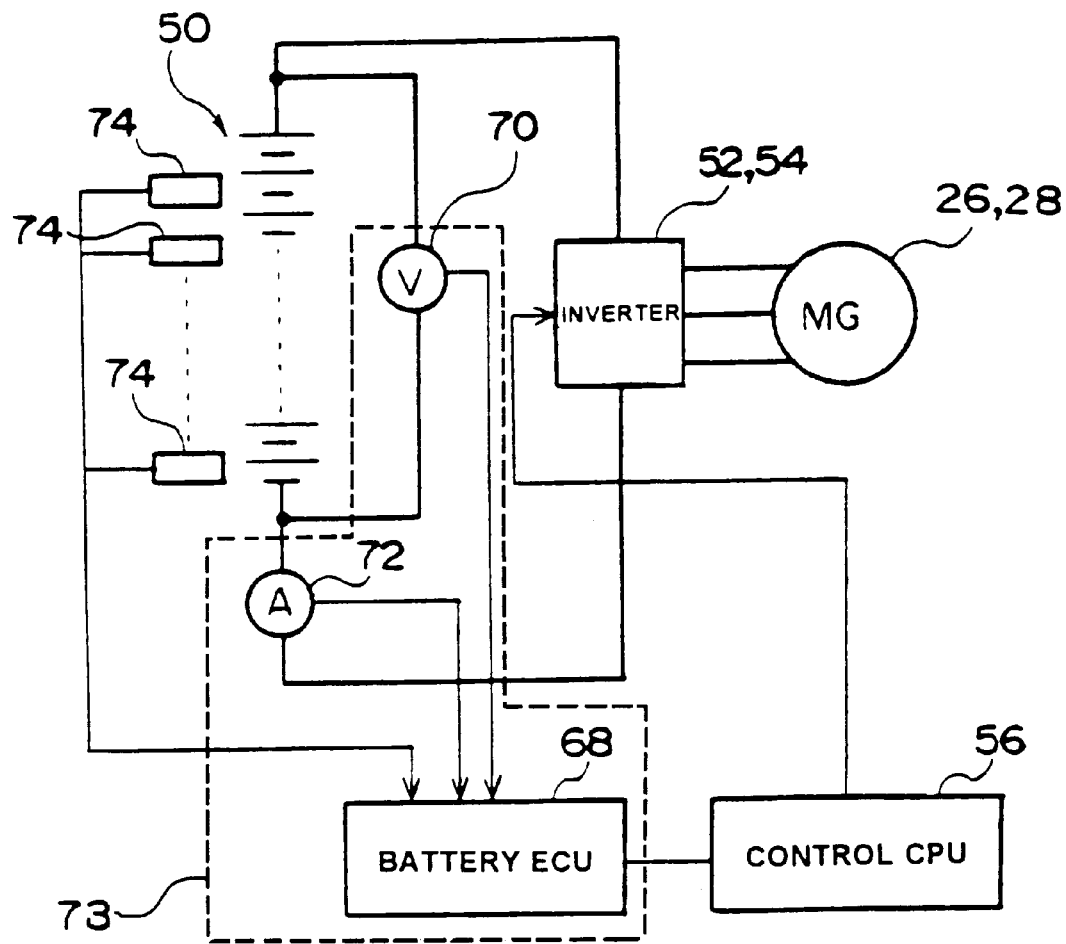
FIG. 2 is a figure showing the rough arrangement of an embodiment of the present invention.

In FIG. 2, the rough arrangement of a battery charge circuit and a charge and discharge control device of the present embodiment is shown. In FIG. 2, components corresponding to those in FIG. 1 are given the same reference members. The battery 50 is a battery assembly having a plurality of cells arranged in series as shown in the figure, and is connected to motor generators 26, 28 through inverters 52, 54. Furthermore, a voltage sensor 70 for detecting the terminal voltage of the battery 50 and a current sensor 72 for detecting the current flowing in the battery 50 are provided. Moreover, at a plurality of positions of the battery 50, temperature sensors 74 for detecting the temperature of the battery are provided. Temperature sensors 74 are provided at a plurality of positions because the temperature of the battery 50 differs depending on location. The outputs of the voltage sensor 70, the current sensor 72, and the temperature sensors 74 are sent to the battery ECU 68. In the battery ECU 68, the charge level of the battery is calculated on the basis of the obtained voltage and current, and further, information relating to the temperature is sent out to the control CPU 56. The control CPU 56 integrates the data sent from the battery ECU 68 and the above mentioned various types of data, determines the operational states of the motor generators 26, 28, and performs the control of the inverters 52, 54 according thereto. Accordingly, the temperature sensor 74 functions as a temperature detecting means, and the voltage sensor 70, the current sensor 72, and the battery ECU 68 function as charge level detecting means 73 or charge level detectors 73.

The calculation of the charge level of a battery is performed as follows. In a nickel hydrogen battery used in the present embodiment, the measurable physical parameters such as the terminal voltage changes little in the range where the charge level is from 20% to 80% of the total capacity. Therefore, in the range where the charge level is 20%~80%, the charge level is estimated by integrating the currents which have flowed by that time. Furthermore, in the range where the charge level is not more than 20% or not less than 80%, a map to show the charge level corresponding to the current and the voltage at that time, has previously been stored, and the charge level is calculated by collating the detected current and voltage with the map.

Figure 3:
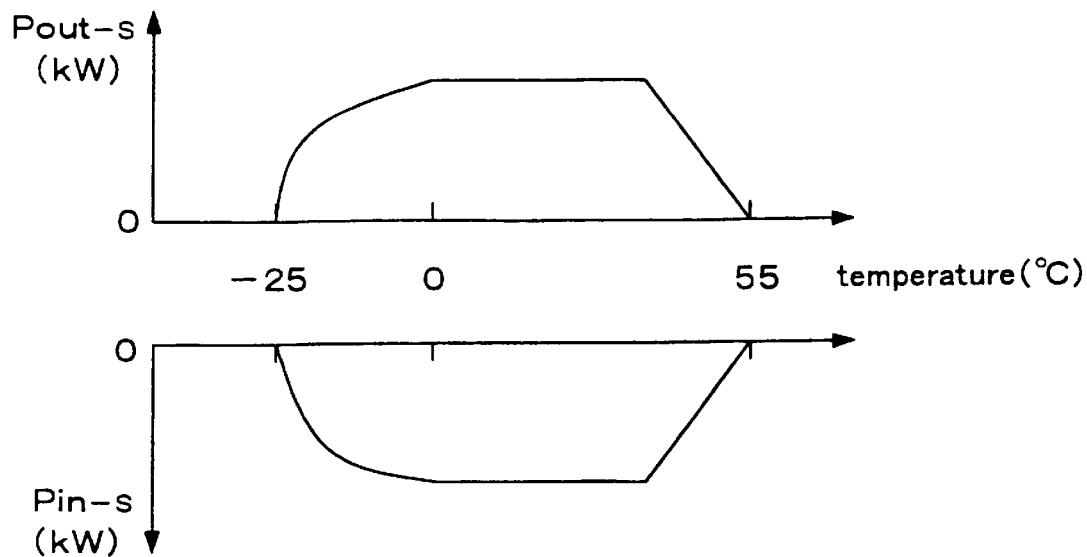
FIG. 3 is a figure showing the upper limit value of the electric power of charge and discharge relative to the temperature of a battery.

The control CPU 56 determines the upper limit value of the charging and the discharging electric power on the basis of the detected temperature of the battery. In FIG. 3, the upper limit value Pout-s of the discharging electric power and the upper limit value Pin-s of the charging electric power, which are determined by temperature, are shown. Generally, a battery has such a tendency that when the temperature becomes low, the electric power which can stably be discharged is lowered. That is, when it is intended that a heavy current be allowed to flow at a low temperature, the voltage is lowered. This diminution of the voltage means in the present embodiment that the voltage to perform the control of each device is lowered, and it may become impossible to operate the first and second motor generators 26, 28, the engine 10, or the like. Accordingly, at a low temperature, it is determined and stored that as shown in the figure, the upper limit value Pout-s of the discharging electric power becomes small as the temperature becomes low. In the control CPU 56, the electric power of discharge is determined in the range where it does not exceed this upper limit value, and on the basis of this, the inverters 52, 54 and the like are controlled. Furthermore, when the charge is performed at a low temperature, if a heavy current is allowed to flow, the terminal voltage of the battery 50 is raised. If this voltage exceeds the withstand voltage of other circuit parts such as a capacitor, this part may be broken in some cases. Therefore, for protecting the circuit parts, it is determined and stored that a heavy current is not allowed to flow at a low temperature, and that the upper limit value Pin-s of the electric power of charge becomes small as the temperature becomes low. Then, in the control CPU 56, the electric power of charge is determined in the range where it does not exceed this upper limit value, and on the basis of this, the inverters 52, 54 and the like are controlled.

It is known that when the temperature of a battery becomes high, the degradation of the battery is accelerated. Therefore, as shown in FIG. 3, it is also determined that the upper limit values Pin-s, Pout-s of the charging and the discharging electric power become small as the temperature becomes high at a high temperature, and it is stored in advance. The upper limit value is gradually made small because the heating of the battery by the Joule's heat generated during the charge and discharge is considered, as is the delaying of the time of reaching the upper limit temperature 55° C. of the present embodiment. Furthermore, charge efficiency decreases when the temperature is high, and this decreasing area further adds reaction heat, which may, in turn, further raise the temperature. Furthermore, if the charging and the discharging electric power is made to be 0 suddenly at the time when the temperature has reached the upper limit temperature, the control becomes discontinuous and the occupant may feel a physical disorder during the running of the vehicle, and therefore, the upper limit value is made small more than enough.

Furthermore, the upper limit values Pin-s, Pout-s of the charging and the discharging electric power are determined to be constant values on the basis of the withstand voltage of circuit parts or the like at a middle range temperature.

Figure 4:
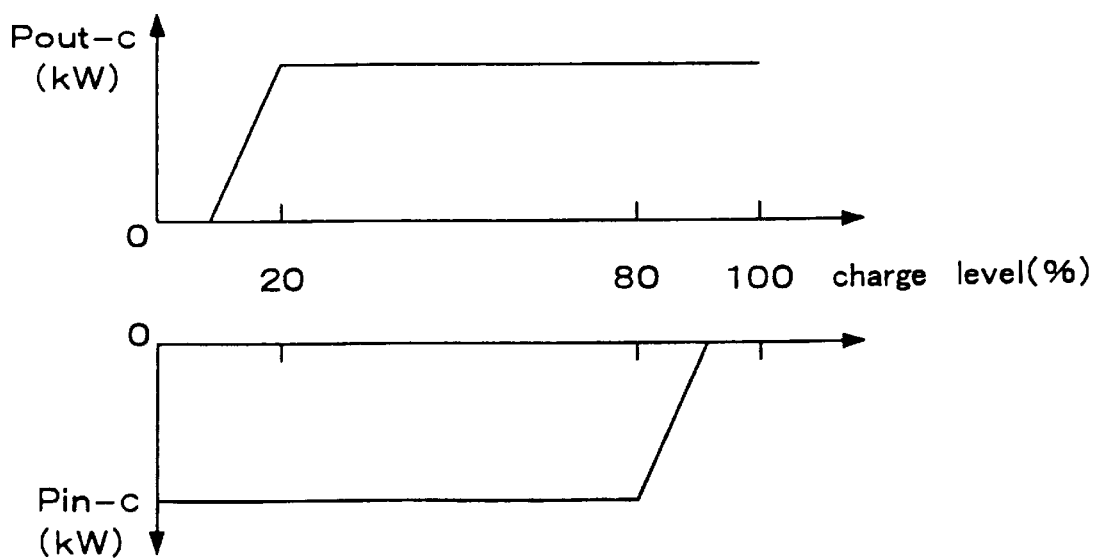
FIG. 4 is a figure showing the upper limit value of the electric power of charge and discharge relative to the charge level of the battery.

In FIG. 4, the upper limit values Pin-c, Pout-c of the charging and the discharging electric power which are determined according to the charge level of the battery, are shown. When the charge level becomes small, the degradation of the battery because of the over discharge is accelerated, and further, in a nickel hydrogen battery, hydrogen may be generated. Furthermore, in the present embodiment, since the start up of the engine 10 is performed by the first and second motor generators 26, 28, it is necessary to ensure the charge level needed for this at all times. Therefore, in the present invention, it is so arranged that if the charge level becomes, for example, 20% or less, the upper limit value Pout-c of the discharging electric power is made smaller so that further lowering of the charge level maybe restrained. Furthermore, the reason why the upper limit value Pout-c of the discharge is gradually made smaller after the charge level has fallen below 20% as shown in the figure, is that if this value is suddenly changed, the control becomes discontinuous in some cases and the occupant may feel physical discomfort during vehicle operation.

Furthermore, if the charge level is increased, a lowering of charge efficiency, heat evolution, or the like arises. In order to restrain this, in the present embodiment, if the charge level exceeds, for example, 80%, the upper limit value Pin-c of the charging electric power is made smaller so that the charge may be restrained. Furthermore, the upper limit value Pin-c of the charge may gradually be made smaller after the charge level has exceeded 80% as shown in the figure because, if this value is suddenly changed, the control becomes discontinuous in some cases and the occupant may feel a physical disorder during the running of the vehicle.

Furthermore, in a range other than that mentioned above, that is, in a range where the charge level is 20% or more during discharge and in the range where the charge level is 80% during charge, the upper limit values Pin-c, Pout-c of the electric power of charge and discharge are determined to be constant values fixed by the withstand voltage of the circuit or the like.

Figure 5A:
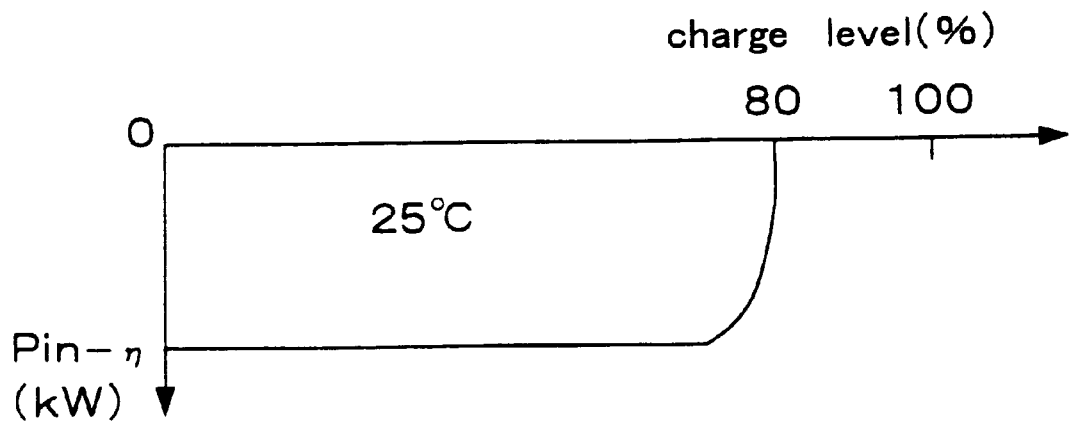
FIGS. 5A and 5B are figures showing the upper limit value of the electric power of charge and discharge relative to the temperature of the battery and the charge level.
Figure 5B:
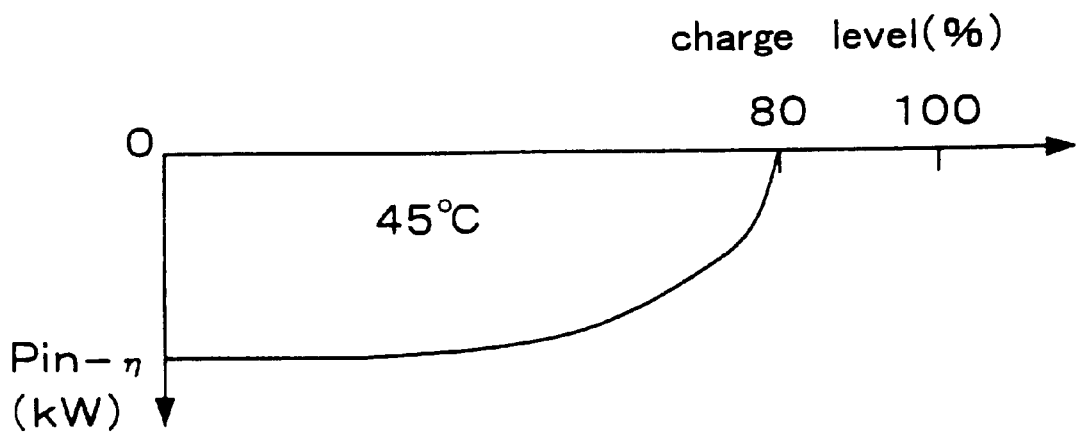

In FIGS. 5A and 5B, the upper limit value Pin-$\eta$ of the charging electric power determined by considering the heat evolution by the charge is shown. When compared at the same charge level, the charge efficiency when the temperature of a battery is high, is lower than that when the temperature is low, and therefore, the heat evolution is also larger when the temperature is high. Accordingly, if the temperature of the battery is high, a heat evolution arises, and the temperature of the battery may suddenly rise. In order to avoid such a sudden temperature rise, it is arranged that, if the temperature of the battery is low, a heat evolution to some extent is allowed while, on the other hand, if the temperature of the battery is high, the heat evolution is restrained. That is, as shown in FIG. 5A, when the temperature of the battery is a low temperature, for example, 25° C., the upper limit value Pin-$\eta$ is determined so that a large charging electric power can be ensured up to a point near the upper limit, 80% of the charge level. Furthermore, as shown in FIG. 5B, when the temperature of the battery is a high temperature, for example, 45° C., the upper limit value Pin-$\eta$ is lowered so that the electric power of charge may be restrained from a comparatively low charge level. Furthermore, actually, such setting of the upper limit value as shown in FIGS. 5A and 5B are performed at some temperatures other than 25° C. and 45° C. Then, the graph at a temperature which is most adjacent to the detected temperature of the battery, is selected and the upper limit value of the electric power of charge at that moment is determined. Thus, the upper limit value Pin-$\eta$ of the charging electric power is determined as a dual function in which two of the temperature of the battery and the charge level are variables, and consequently, a control of charge in conformity with the state of the battery at that time is performed. Furthermore, it is also possible during the discharge that the upper limit value Pout-$\eta$ of the discharging electric power is similarly determined as a dual function in which the temperature of the battery and the charge level are variables, and on the basis of this, the control is performed.

Furthermore, it is also possible that the control be performed by using, as the upper limit value at that moment, the upper limit value which is smallest among the upper limit values Pin-s, Pout-s determined from the temperature of the battery, the upper limit values Pin-c, Pout-c determined from the charge level, and the upper limit values Pin-$\eta$, Pout-$\eta$ determined from the temperature of the battery and the charge level.

Furthermore, in some cases, an equalizing charge is performed, in which the charge is intentionally performed even if the charge level is a high level of 80% or more, for equalizing the charge level of each battery. In this case, the charge is performed by determining, as the upper limit value, the value which is smaller between the upper limit values Pin-s, Pout-s determined from the temperature of the battery and the upper limit values Pin-c, Pout-c determined from the charge level. This is because it is considered that if the upper limit values Pin-$\eta$, Pout-$\eta$ are also adopted, the charge may not be performed when the charge level is 80% or more, as shown in FIGS. 5A and 5B.

As mentioned above, in the present embodiment, the control CPU 56 functions as a charging and discharging electric power limiting means or a charging and discharging electric power limiter which controls the charging and the discharging electric power so that it may not exceed the upper limit value of the charging and the discharging electric power.

As described above, according to the present embodiment, by performing a control corresponding to the environment of temperature of a battery and the state of charge of the battery, it can be achieved that, while the degradation of the battery is avoided, the occupant does not feel any physical discomfort in the running performance of a hybrid electric vehicle.

Furthermore, in the present embodiment, the description has been given by showing a battery mounted on a hybrid electric vehicle, as an example, but the present invention can be applied to a battery of any purpose. Furthermore, it can be applied to not only a nickel metal hydride battery of the present embodiment but also a lithium ion battery, a nickel cadmium battery, a lead-acid battery, and the like.

What is claimed is:

1. A secondary battery charge and discharge controller comprising:

a temperature detector for detecting the temperature of said secondary battery; and a limiter for controlling the charging and the discharging electric power so that the charging and discharging electric power may not exceed a previously determined first upper limit value of the charging and the discharging electric power which changes according to the temperature, in a case where said detected temperature is a first predetermined temperature or less.

2. The secondary battery charge and discharge controller according to claim 1, wherein said limiter controls the charging and the discharging electric power so that the charging and the discharging electric power may not exceed the upper limit value which is lower between a previously determined second upper limit value of the charging and the discharging electric power which changes according to the temperature, and said first upper limit value of the charging and the discharging electric power, in a case where said detected temperature is a second predetermined temperature or more.

3. The secondary battery charge and discharge controller according to claim 2, further comprising a charge level detector for detecting the charge level of said secondary battery, wherein said limiter controls the charging and the discharging electric power so that the charging and the discharging electric power may not exceed the upper limit value which is lowest among a previously determined third upper limit value of the charging and the discharging electric power which changes according to said detected charge level, said first upper limit value, and said second upper limit value.

4. The secondary battery charge and discharge controller according to claim 3, wherein said limiter controls the charging and the discharging electric power so that the charging and the discharging electric power may not exceed the upper limit value which is lowest among a previously determined fourth upper limit value of the charging and the discharging electric power according to said detected temperature and said detected charge level, said first upper limit value, said second upper limit value, and said third upper limit value.

5. A secondary battery charge and discharge controller comprising:

a temperature detector for detecting the temperature of the secondary battery; and a limiter for controlling the charging and the discharging electric power so that the charging and the discharging electric power may not exceed a previously determined upper limit value of the charging and the discharging electric power which changes according to the temperature, in a case where said detected temperature is a predetermined temperature or more.

6. A secondary battery charge and discharge controller comprising:

a temperature detector for detecting the temperature of the secondary battery;

a charge level detector for detecting the charge level of the secondary battery; and a charging and discharging electric power limiter for controlling the charging and the discharging electric power so that the charging and the discharging electric power may not exceed a previously determined upper limit value of the charging and the discharging electric power, according to said detected temperature and said detected charge level.

7. The secondary battery charge and discharge controller according to claim 4, wherein said controller has an equalizing charge function for equalizing each charge level for a plurality of secondary battery cells, wherein said limiter controls the charging and the discharging electric power so that the electric power of charge and discharge may not exceed the upper limit value which is lowest among said first upper limit value, said second upper limit value, and said third upper limit value, during said equalizing charge.

* * * * *